(12) United States Patent
Chen

(10) Patent No.: US 12,137,381 B2
(45) Date of Patent: Nov. 5, 2024

(54) RANDOM ACCESS METHOD AND TERMINAL

(71) Applicant: VIVO MOBILE COMMUNICATION CO., LTD., Guangdong (CN)

(72) Inventor: Li Chen, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 369 days.

(21) Appl. No.: 17/506,504

(22) Filed: Oct. 20, 2021

(65) Prior Publication Data

US 2022/0110036 A1 Apr. 7, 2022

Related U.S. Application Data

(63) Continuation of application No. PCT/CN2020/086708, filed on Apr. 24, 2020.

(30) Foreign Application Priority Data

Apr. 26, 2019 (CN) .......................... 201910345900.2

(51) Int. Cl.
*H04W 36/00* (2009.01)
*H04W 36/08* (2009.01)
*H04W 74/0833* (2024.01)

(52) U.S. Cl.
CPC . *H04W 36/00837* (2018.08); *H04W 36/0058* (2018.08); *H04W 36/0085* (2018.08); *H04W 36/08* (2013.01); *H04W 74/0841* (2013.01)

(58) Field of Classification Search
None
See application file for complete search history.

(56) References Cited

U.S. PATENT DOCUMENTS

| | | | |
|---|---|---|---|
| 11,115,888 B2* | 9/2021 | Fujishiro | H04W 36/24 |
| 2018/0279193 A1* | 9/2018 | Park | H04W 36/24 |
| 2021/0345191 A1* | 11/2021 | Da Silva | H04B 7/0695 |

FOREIGN PATENT DOCUMENTS

| | | | | |
|---|---|---|---|---|
| WO | 2018156696 A1 | 8/2018 | | |
| WO | WO-2018174801 A1 * | 9/2018 | | H04L 1/0026 |
| WO | WO-2019030725 A1 * | 2/2019 | | H04B 7/0626 |
| WO | WO-2019064270 A1 * | 4/2019 | | H04B 7/0695 |
| WO | WO-2019195060 A1 * | 10/2019 | | H04W 24/08 |

OTHER PUBLICATIONS

3GPP TSG-RAN WG2 Meeting #105bis , Consideration of Beamforming for NR Conditional Handover, Apr. 8-12, 2019, R2-1904344, Entire document (Year: 2019).*
CMCC, "Consideration of Beamforming for NR Conditional Handover," 3GPP TSG RAN WG2 Meeting #105bis, R2-1904344, Dec. 4, 2019, pp. 1-4.
(Continued)

*Primary Examiner* — Gerald A Smarth
(74) *Attorney, Agent, or Firm* — Brooks Kushman P.C.

(57) ABSTRACT

This disclosure provides a random access method and a terminal, where the random access method includes: obtaining beam measurement result(s) of at least one potential target cell; selecting a target cell from the at least one potential target cell based on the beam measurement result(s) and a first conditional handover trigger condition; and initiating a random access procedure in the target cell.

20 Claims, 2 Drawing Sheets

(56) References Cited

OTHER PUBLICATIONS

ZTE, "Consideration on scheduling enhancement for MTC," 3GPP TSG RAN WG1 Meeting #96bis, R1-1904344, Apr. 12, 2019, pp. 1-8.
Vivo, "Triggers for conditional handover," 3GPP TSG-RAN WG2 Meeting #1 OSbis, R2-1903436, Apr. 12, 2019, pp. 1-2.
Ericsson, "Triggering of Conditional Handover in NR," 3GPP TSG RAN WG2 #1 OSbis, R2-1903517, Apr. 12, 2019, pp. 1-7.
Interdigital Inc., "Triggers for Conditional Handover in NR," Triggers for Conditional Handover in NR R2-1903560, Apr. 12, 2019, pp. 1-4.
Mediatek Inc., "Conditional Handover in High Frequency," 3GPP TSG-RAN WG2 Meeting #105bis, R2-1903243, Apr. 12, 2019, pp. 1-3.
Intel Corporation, "Report of the email discussion [105#58][NR/MOB] Comparison of LTE and NR Conditional handover," 3GPP TSG RAN WG2 Meeting #105bis, R2-1903450, Apr. 12, 2019, pp. 1-24.
International Search Report with Written Opinion from PCT Application No. PCT/CN2020/086708, Nov. 2, 2021.

\* cited by examiner

RANDOM ACCESS METHOD AND TERMINAL

CROSS-REFERENCE TO RELATED APPLICATIONS

This application is a continuation application of International Application No. PCT/CN2020/086708 filed on Apr. 24, 2020, which claims priority to Chinese Patent Application No. 201910345900.2, filed in China on Apr. 26, 2019, which are incorporated herein by reference in their entireties.

TECHNICAL FIELD

This disclosure relates to the field of communications technologies, and in particular, to a random access method and a terminal.

BACKGROUND

To avoid handover failure resulting from inability of a terminal to receive a handover command related message from a source node after a channel condition of a source cell deteriorates, the conditional handover (CHO) procedure is introduced. In a current CHO procedure, a terminal may determine whether a trigger condition for conditional handover is satisfied based on a cell measurement result of a source cell and/or target cell, and when determining that the trigger condition for conditional handover is satisfied, the terminal executes a handover procedure and initiates a random access procedure to a target node.

However, because a current network node may be configured with multiple transmission reception points (TRP), the terminal may initiate a random access procedure on multiple beams, and a cell measurement result often cannot truly reflect a beam condition of a corresponding cell, resulting in a low handover success rate of the current CHO procedure.

SUMMARY

Embodiments of this disclosure provide a random access method and a terminal to resolve a problem of a low handover success rate in a current conditional handover procedure.

To resolve the foregoing technical problem, this disclosure is implemented as follows:

According to a first aspect, an embodiment of this disclosure provides a random access method, applied to a terminal and including:
  obtaining beam measurement result(s) of at least one potential target cell;
  selecting a target cell from the at least one potential target cell based on the beam measurement result(s) and a first conditional handover trigger condition; and
  initiating a random access procedure in the target cell.

According to a second aspect, an embodiment of this disclosure provides a terminal, including:
  a first obtaining module, configured to obtain beam measurement result(s) of at least one potential target cell;
  a first selecting module, configured to select a target cell from the at least one potential target cell based on the beam measurement result(s) and a first conditional handover trigger condition; and
  an initiating module, configured to initiate a random access procedure in the target cell.

According to a third aspect, an embodiment of this disclosure provides a terminal, including a memory, a processor, and a computer program stored in the memory and capable of running on the processor, where when the computer program is executed by the processor, the steps in the foregoing random access method are implemented.

According to a fourth aspect, an embodiment of this disclosure provides a computer-readable storage medium, where the computer-readable storage medium stores a computer program, and when the computer program is executed by a processor, the steps of the foregoing random access method are implemented.

In the embodiments of this disclosure, beam measurement result(s) of at least one potential target cell is obtained, a target cell is selected from the at least one potential target cell based on the beam measurement result(s) and a first conditional handover trigger condition, and a random access procedure is initiated in the target cell. This can introduce the beam measurement result into the trigger condition for conditional handover, thereby implementing a conditional handover procedure based on the beam measurement result, increasing a handover success rate, and ensuring communication efficiency.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings.

DESCRIPTION OF EMBODIMENTS

Figure 1:
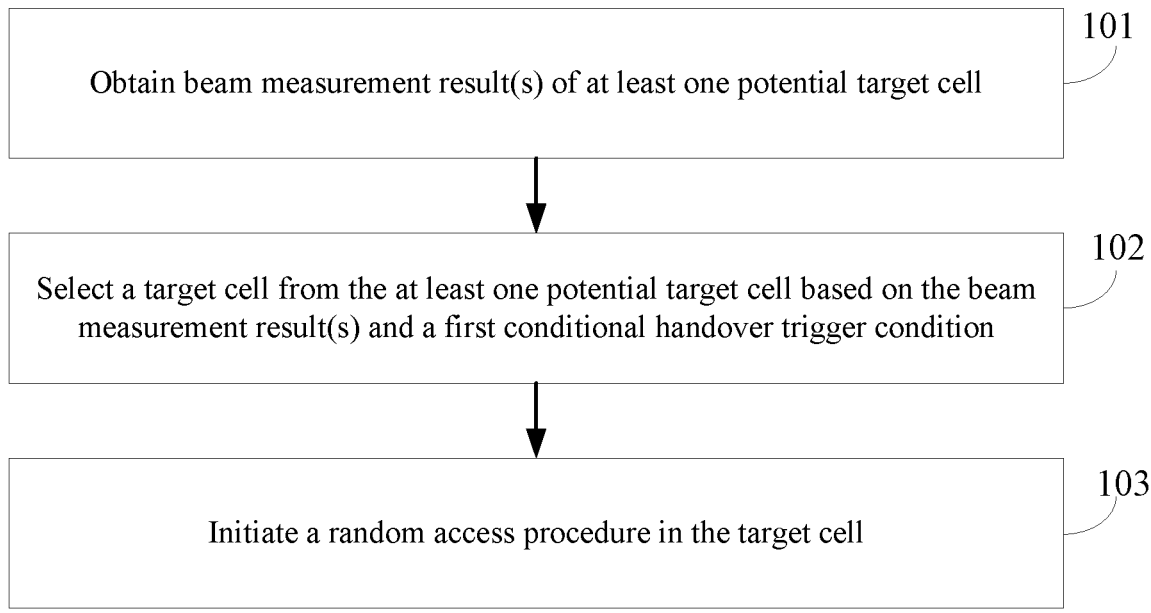
FIG. 1 is a flowchart of a random access method according to an embodiment of this disclosure.

To describe the technical solutions in the embodiments of this disclosure more clearly, the following briefly describes the accompanying drawings required for describing the embodiments of this disclosure. Apparently, the accompanying drawings in the following descriptions show only some embodiments of this disclosure, and a person of ordinary skill in the art may still derive other drawings from these accompanying drawings.

For ease of understanding of this disclosure, a conditional handover procedure of the embodiments of this disclosure is described first. Optionally, the conditional handover procedure in the embodiments of this disclosure mainly includes the following steps.

S1: A source node transmits a handover request message to no less than one (meaning at least one) potential target node.

S2: Optionally, the potential target node performs access control on a terminal. The potential target node reserves or configures a random access channel (RACH) resource for handover of the terminal, where the resource is for the terminal to initiate random access to the potential target node.

S3: (If access control is allowed) The potential target node transmits a handover response message to the source node.

Optionally, the handover response message may include a handover command, and the handover command is transparently transmitted to the terminal through the source node.

S4: The source node transmits a message including a handover command to the terminal. For example, the message may be a radio resource control (RRC) reconfiguration message or a mobility control message. Optionally, the message may include a trigger condition for conditional handover.

S5: The terminal measures a potential target cell based on a network configuration to obtain a measurement result; and if the measurement result meets a configuration or a preset condition, the terminal initiates a random access procedure in the corresponding target cell. Optionally, the measurement result may include a beam measurement result (or referred to as a cell reference signal measurement result) and/or a cell measurement result.

The objective of the embodiments of this disclosure is to at least provide a random access method based on a beam measurement result and a terminal, so as to determine whether a trigger condition for conditional handover is satisfied based on beam measurement result(s) of at least one potential target cell, or so as to determine whether a trigger condition for conditional handover is satisfied based on a beam measurement result and a cell measurement result of at least one potential target cell, select a target cell satisfying the trigger condition from the at least one potential target cell, and initiate a random access procedure in the target cell. In this way, the beam measurement result can be introduced into the trigger condition for conditional handover, thereby implementing a conditional handover procedure based on the beam measurement result, increasing a handover success rate, and ensuring communication efficiency.

It can be understood that, in specific implementation, the terminal in the embodiments of this disclosure may alternatively adopt a method in the related art, to be specific, determine whether a trigger condition for conditional handover is satisfied based on a cell measurement result of at least one potential target cell, select a target cell satisfying the trigger condition from the at least one potential target cell, and initiate a random access procedure in the target cell.

The following describes this disclosure in detail with reference to the embodiments and the accompanying drawings.

Referring to FIG. 1, FIG. 1 is a flowchart of a random access method according to an embodiment of this disclosure. The method is applied to a terminal, and, as shown in FIG. 1, includes the following steps.

Step 101: Obtain beam measurement result(s) of at least one potential target cell.

The at least one potential (potential or candidate) target cell may be determined by a source cell. To obtain the beam measurement result of the potential target cell, the terminal may measure the potential target cell based on a network configuration.

In this embodiment, the beam measurement result can be understood as a cell reference signal measurement result. The beam measurement result may include but is not limited to at least one of the following:
 a measurement result of a channel state information reference signal (CSI-RS);
 a measurement result of a synchronization signal and PBCH block (Synchronization Signal and PBCH block, SSB);
 a measurement result of a demodulation reference signal (DMRS); or a measurement result of another reference signal.

Optionally, the measurement result may include but is not limited to at least one of the following:
 reference signal received power (RSRP);
 reference signal received quality (RSRQ);
 a signal to interference plus noise ratio (SINR); or
 a channel quality indicator (CQI).

Step 102: Select a target cell from the at least one potential target cell based on the beam measurement result(s) and a first conditional handover trigger condition.

The first trigger condition for conditional handover may be pre-configured by a network, or prescribed by a protocol, or transmitted by a network node to the terminal, which is not limited in this embodiment of this disclosure.

It can be understood that, during execution of step 102, if a beam measurement result of only one potential target cell satisfies the first conditional handover trigger condition, the terminal may directly select the potential target cell as the target cell; and if beam measurement results of a plurality of potential target cells satisfy the first conditional handover trigger condition, the terminal may select the target cell from the plurality of potential target cells based on a preset condition. The preset condition is, for example, being a cell with a maximum quantity of beams among the target cells whose measurement results satisfy a determining condition, but is not limited thereto.

Step 103: Initiate a random access procedure in the target cell.

In the random access method of this embodiment of this disclosure, beam measurement result(s) of at least one potential target cell is obtained, a target cell is selected from the at least one potential target cell based on the beam measurement result(s) and a preset conditional handover trigger condition, and a random access procedure is initiated in the target cell. This can introduce the beam measurement result into the trigger condition for conditional handover, thereby implementing a conditional handover procedure based on the beam measurement result, increasing a handover success rate, and ensuring communication efficiency.

In this embodiment of this disclosure, the first trigger condition for conditional handover is optionally associated with beam measurement result(s); or associated with both beam measurement result(s) and cell measurement result(s).

Optionally, when the first trigger condition for conditional handover is associated with beam measurement result(s), the first trigger condition for conditional handover may be that a beam measurement result of a potential target cell satisfies a first determining condition.

In this way, a conditional handover procedure based on beam measurement result(s) can be implemented.

Optionally, when the first trigger condition for conditional handover is associated with beam measurement result(s), a precondition for adopting the first trigger condition for conditional handover may be any one of the following:
 that the terminal is configured with a parameter relevant to the first determining condition, where the relevant parameter is, for example, a preset threshold and a preset quantity;
 that the terminal is configured with no parameter relevant to a second determining condition, where the relevant parameter is, for example, a preset threshold and a preset quantity of to-be-averaged beams;
 that the terminal is configured with a parameter relevant to the first determining condition (for example, a preset threshold and a preset quantity) and a parameter relevant to a second determining condition (for example, a preset threshold and a preset quantity of to-be-averaged beams); or that the terminal is configured with indication information, where the indication information is used to explicitly or implicitly indicate that a trigger condition for conditional handover be determined based on beam measurement result(s), or the indication information is used to explicitly or implicitly indicate that a trigger condition for conditional handover be determined based on beam measurement result(s) and cell measurement result(s); where the first determining condition is a condition corresponding to beam measurement result(s), and the second determining condition is a condition corresponding to cell measurement result(s). The foregoing preset quantity of to-be-averaged beams is used to determine the cell measurement result. To be specific, during cell measurement result calculation, the cell measurement result is obtained by averaging measurement results of a preset quantity of beams or a preset quantity of beams whose measurement results are greater than a preset threshold.

Optionally, the configured relevant parameter of the first determining condition in the terminal may be pre-configured by the terminal, or may be transmitted by a network node to the terminal. Optionally, the configured relevant parameter of the second determining condition in the terminal may be pre-configured by the terminal, or may be transmitted by a network node to the terminal. Optionally, the configured indication information in the terminal may be pre-configured by the terminal, or may be transmitted by a network node to the terminal.

In this way, with the foregoing configuration method, the terminal may choose to introduce the beam measurement result into the trigger condition for conditional handover, thereby implementing a conditional handover procedure based on the beam measurement result.

Optionally, the first determining condition may include but is not limited to any of the following:

that a beam whose measurement result is not less than a first preset threshold is present in a potential target cell;

that a quantity of first beams in a potential target cell is greater than or equal to a first preset quantity, where a measurement result of the first beam is not less than a second preset threshold;

that a quantity of second beams in a potential target cell is greater than or equal to a quantity of third beams in a serving cell, where a measurement result of the second beam is not less than a third preset threshold, and a measurement result of the third beam is not less than a fourth preset threshold; and it can be understood that the third preset threshold and the fourth preset threshold may be the same or different; and that a difference between a quantity of fourth beams in a potential target cell and a quantity of fifth beams in a serving cell is greater than or equal to a second preset quantity, where a measurement result of the fourth beam is not less than a fifth preset threshold, and a measurement result of the fifth beam is not less than a sixth preset threshold; and it can be understood that the fifth preset threshold and the sixth preset threshold may be the same or different.

It should be noted that the first preset threshold, second preset threshold, third preset threshold, fourth preset threshold, fifth preset threshold, and sixth preset threshold may be configured through a network, or may be prescribed by a protocol, or may be a threshold for selecting a random access reference signal resource, such as rsrp-ThresholdSSB or rsrp-ThresholdCSI-RS.

The first preset quantity and the second preset quantity may be the same or may be different. Further, the first preset quantity and the second preset quantity may be configured through a network, or may be prescribed by a protocol, or may be greater than or equal to a quantity of beams activated by a TRP.

Optionally, when the first trigger condition for conditional handover is associated with both beam measurement result(s) and cell measurement result(s), before step 102, the method further includes:

obtaining cell measurement result(s) of the at least one potential target cell; and the foregoing step 102 includes:

selecting the target cell from the at least one potential target cell based on the beam measurement result(s), the cell measurement result(s), and the first conditional handover trigger condition.

In this way, both beam measurement result(s) and cell measurement result(s) can be used as the trigger condition for conditional handover, thereby ensuring the handover success rate and improving the communication efficiency.

Optionally, when the first trigger condition for conditional handover is associated with both beam measurement result(s) and cell measurement result(s), the first trigger condition for conditional handover may be:

that a beam measurement result of a potential target cell satisfies a first determining condition, and a cell measurement result of the potential target cell satisfies a second determining condition.

Further, the selecting the target cell from the at least one potential target cell based on the beam measurement result(s), the cell measurement result(s), and the first trigger condition for conditional handover includes:

in a case that cell measurement results of a plurality of potential target cells satisfy the second determining condition, selecting a potential target cell with a largest quantity of sixth beams as the target cell, or selecting any one of potential target cells with a quantity of seventh beams greater than a third preset quantity as the target cell; where a measurement result of the sixth beam satisfies the first determining condition; and a measurement result of the seventh beam satisfies the first determining condition.

The first determining condition may be as described above, and is not repeated herein. The second determining condition is a determining condition of the cell measurement result, may be at least one of existing measurement report events, and may include at least one of the following events:

event A1: that a cell measurement result of a serving cell is greater than a first absolute threshold;

event A2: that a cell measurement result of a serving cell is less than a second absolute threshold;

event A3: that a cell measurement result of a potential target cell is better than a cell measurement result of a serving cell;

event A4: that a cell measurement result of a potential target cell is greater than a third absolute threshold; or event A5: that a cell measurement result of a serving cell is less than a fourth absolute threshold, and a cell measurement result of a potential target cell is greater than a fifth absolute threshold.

It can be understood that the first absolute threshold, second absolute threshold, third absolute threshold, fourth absolute threshold, and fifth absolute threshold may be the same or different; and further may be configured through a network, or prescribed by a protocol. This is not limited in this embodiment of this disclosure.

Optionally, when the first trigger condition for conditional handover is associated with both beam measurement result(s) and cell measurement result(s), a precondition for adopting the first trigger condition for conditional handover may be any one of the following:

that the terminal is configured with a parameter relevant to the first determining condition (for example, a preset threshold and a preset quantity) and a parameter relevant to a second determining condition (for example, a preset threshold and a preset quantity of to-be-averaged beams); or that the terminal is configured with indication information, where the indication information is used to explicitly or implicitly indicate that a trigger condition for conditional handover be determined based on the beam measurement result(s) and cell measurement result(s); where the first determining condition is a condition corresponding to beam measurement result(s), and the second determining condition is a condition corresponding to cell measurement result(s).

Optionally, the configured relevant parameter of the first determining condition in the terminal may be pre-configured by the terminal, or may be transmitted by a network node to the terminal. Optionally, the configured relevant parameter of the second determining condition in the terminal may be pre-configured by the terminal, or may be transmitted by a network node to the terminal. Optionally, the configured indication information in the terminal may be pre-configured by the terminal, or may be transmitted by a network node to the terminal.

In this way, with the foregoing configuration method, the terminal may choose to introduce both the beam measurement result and the cell measurement result into the trigger condition for conditional handover, thereby ensuring the handover success rate and improving communication efficiency.

In this embodiment of this disclosure, optionally, the method further includes:

obtaining cell measurement result(s) of the at least one potential target cell; and selecting a target cell from the at least one potential target cell based on the cell measurement result and a second conditional handover trigger condition; where the second trigger condition for conditional handover is:

that a cell measurement result of a potential target cell satisfies a second determining condition.

It can be understood that the second trigger condition for conditional handover is associated with cell measurement result(s). The second determining condition may be as described above, and is not repeated herein.

Optionally, a precondition for adopting the second trigger condition for conditional handover may be any one of the following:

that the terminal is configured with no parameter relevant to a first determining condition (for example, a preset threshold and a preset quantity);

that the terminal is configured with a parameter relevant to the second determining condition (for example, a preset threshold and a preset quantity of to-be-averaged beams);

that the terminal is configured with a parameter relevant to a first determining condition (for example, a preset threshold and a preset quantity) and a parameter relevant to the second determining condition; or that the terminal is configured with indication information, where the indication information is used to explicitly or implicitly indicate that a trigger condition for conditional handover be determined based on cell measurement result(s), or the indication information is used to explicitly or implicitly indicate that a trigger condition for conditional handover be determined based on the beam measurement result(s) and cell measurement result(s); where the first determining condition is a condition corresponding to beam measurement result(s), and the second determining condition is a condition corresponding to cell measurement result(s). The first determining condition and the second determining condition may be as described above, and are not repeated herein.

Optionally, the configured relevant parameter of the first determining condition in the terminal may be pre-configured by the terminal, or may be transmitted by a network node to the terminal. Optionally, the configured relevant parameter of the second determining condition in the terminal may be pre-configured by the terminal, or may be transmitted by a network node to the terminal. Optionally, the configured indication information in the terminal may be pre-configured by the terminal, or may be transmitted by a network node to the terminal.

In this way, with the foregoing configuration method, the terminal may choose to introduce the cell measurement result into the trigger condition for conditional handover, thereby implementing a conditional handover procedure based on the cell measurement result.

It can be understood that in at least one embodiment of this disclosure, a determining condition for the beam measurement result (that is, the first determining condition) and/or the determining condition for the cell measurement result (that is, the second determining condition) used for the trigger condition for conditional handover may include any of the following situations.

(1) If the terminal is configured with a parameter relevant to a determining condition for the cell measurement result (for example, a preset threshold and a preset quantity of to-be-averaged beams), or the terminal is configured with no parameter relevant to a determining condition for the beam measurement result (for example, a preset threshold and a preset quantity), the determining condition for the cell measurement result is used; otherwise, the determining condition for the beam measurement result is used.

(2) If the terminal is configured with a parameter relevant to a determining condition for the beam measurement result (for example, a preset threshold and a preset quantity), or the terminal is configured with no parameter relevant to a determining condition for the cell measurement result (for example, a preset threshold and a preset quantity of to-be-averaged beams), the determining condition for the beam measurement result is used; otherwise, the determining condition for the cell measurement result is used.

(3) If the terminal is configured with a parameter relevant to a determining condition for the beam measurement result (for example, a preset threshold and a preset quantity) and a parameter relevant to a determining condition for the cell measurement result (for example, a preset threshold and a preset quantity of to-be-averaged beams), the determining condition for the beam measurement result and/or the determining condition for the cell measurement result are/is used.

(4) If the terminal is configured with indication information, and the indication information is used to explicitly or implicitly indicate using a determining condition for the beam measurement result, or indicate using a determining condition for the beam measurement result and a determining condition for the cell measurement result, the determining condition for the beam measurement result is used.

(5) If the terminal is configured with indication information, and the indication information is used to explicitly or implicitly indicate using a determining condition for the beam measurement result and a determining condition for the cell measurement result, the determining condition for the beam measurement result and the determining condition for the cell measurement result are used.

(6) If the terminal is configured with indication information, and the indication information is used to explicitly or implicitly indicate using a determining condition for the cell measurement result, or indicate using a determining condition for the beam measurement result and a determining condition for the cell measurement result, the determining condition for the cell measurement result is used.

The foregoing embodiment describes the random access method in this disclosure, and the following describes a terminal in this disclosure with reference to the embodiments and the accompanying drawings.

Figure 2:
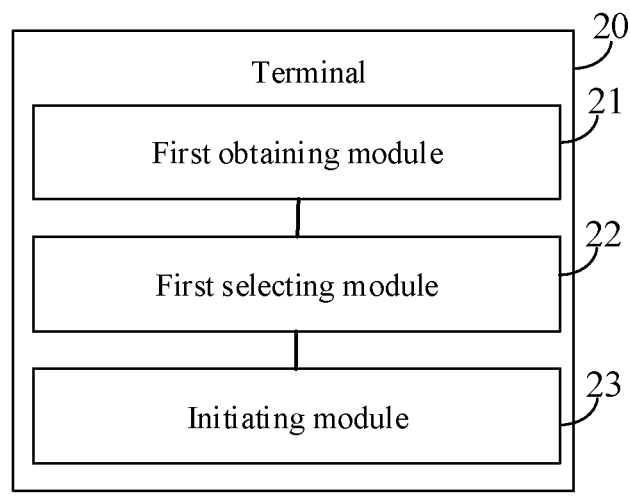
FIG. 2 is a first schematic structural diagram of a terminal according to an embodiment of this disclosure.

Referring to FIG. 2, FIG. 2 is a structural diagram of a terminal according to an embodiment of this disclosure. As shown in FIG. 2, the terminal 20 includes:

a first obtaining module 21, configured to obtain beam measurement result(s) of at least one potential target cell;

a first selecting module 22, configured to select a target cell from the at least one potential target cell based on the beam measurement result(s) and a first conditional handover trigger condition; and an initiating module 23, configured to initiate a random access procedure in the target cell.

According to the terminal of this embodiment of this disclosure, the beam measurement result can be introduced into the trigger condition for conditional handover, thereby implementing a conditional handover procedure based on the beam measurement result, increasing a handover success rate, and ensuring communication efficiency.

In this embodiment of this disclosure, optionally, the first trigger condition for conditional handover is:

that a beam measurement result of a potential target cell satisfies a first determining condition.

Further, a precondition for adopting the first trigger condition for conditional handover is any one of the following:

that the terminal is configured with a parameter relevant to the first determining condition;

that the terminal is configured with no parameter relevant to a second determining condition;

that the terminal is configured with a parameter relevant to a first determining condition and a parameter relevant to the second determining condition; or that the terminal is configured with indication information, where the indication information is used to explicitly or implicitly indicate that a trigger condition for conditional handover be determined based on beam measurement result(s), or the indication information is used to explicitly or implicitly indicate that a trigger condition for conditional handover be determined based on beam measurement result(s) and cell measurement result(s); where the first determining condition is a condition corresponding to beam measurement result(s), and the second determining condition is a condition corresponding to cell measurement result(s).

Optionally, the terminal further includes:

a second obtaining module, configured to obtain cell measurement result(s) of the at least one potential target cell; where the first selecting module is specifically configured to:

select the target cell from the at least one potential target cell based on the beam measurement result(s), the cell measurement result(s), and the first conditional handover trigger condition.

Further, the first trigger condition for conditional handover is:

that a beam measurement result of a potential target cell satisfies a first determining condition, and a cell measurement result of the potential target cell satisfies a second determining condition.

Optionally, the first determining condition includes any one of the following:

that a beam whose measurement result is not less than a first preset threshold is present in a potential target cell;

that a quantity of first beams in a potential target cell is greater than or equal to a first preset quantity, where a measurement result of the first beam is not less than a second preset threshold;

that a quantity of second beams in a potential target cell is greater than or equal to a quantity of third beams in a serving cell, where a measurement result of the second beam is not less than a third preset threshold, and a measurement result of the third beam is not less than a fourth preset threshold; or that a difference between a quantity of fourth beams in a potential target cell and a quantity of fifth beams in a serving cell is greater than or equal to a second preset quantity, where a measurement result of the fourth beam is not less than a fifth preset threshold, and a measurement result of the fifth beam is not less than a sixth preset threshold.

Optionally, the second determining condition includes at least one of the following events:

that a cell measurement result of a serving cell is greater than a first absolute threshold;

that a cell measurement result of a serving cell is less than a second absolute threshold;

that a cell measurement result of a potential target cell is better than a cell measurement result of a serving cell;

that a cell measurement result of a potential target cell is greater than a third absolute threshold; or that a cell measurement result of a serving cell is less than a fourth absolute threshold, and a cell measurement result of a potential target cell is greater than a fifth absolute threshold.

Optionally, the first selecting module is specifically configured to:

in a case that cell measurement results of a plurality of potential target cells satisfy the second determining condition, select a potential target cell with a largest quantity of sixth beams as the target cell, or select any one of potential target cells with a quantity of seventh beams greater than a third preset quantity as the target cell; where a measurement result of the sixth beam satisfies the first determining condition; and a measurement result of the seventh beam satisfies the first determining condition.

Optionally, a precondition for adopting the first trigger condition for conditional handover is any one of the following:
  that the terminal is configured with a parameter relevant to a first determining condition and a parameter relevant to the second determining condition; or
  that the terminal is configured with indication information, where the indication information is used to explicitly or implicitly indicate that a trigger condition for conditional handover be determined based on the beam measurement result(s) and cell measurement result(s); where
  the first determining condition is a condition corresponding to beam measurement result(s), and the second determining condition is a condition corresponding to cell measurement result(s).

Optionally, the terminal further includes:
  a third obtaining module, configured to obtain cell measurement result(s) of the at least one potential target cell; and
  a second selecting module, configured to select a target cell from the at least one potential target cell based on the cell measurement result and a second conditional handover trigger condition; where
  the second trigger condition for conditional handover is:
  that a cell measurement result of a potential target cell satisfies a second determining condition.

Optionally, a precondition for adopting the second trigger condition for conditional handover is any one of the following:
  that the terminal is configured with no parameter relevant to a first determining condition;
  that the terminal is configured with a parameter relevant to the second determining condition;
  that the terminal is configured with a parameter relevant to a first determining condition and a parameter relevant to the second determining condition; or
  that the terminal is configured with indication information, where the indication information is used to explicitly or implicitly indicate that a trigger condition for conditional handover be determined based on cell measurement result(s), or the indication information is used to explicitly or implicitly indicate that a trigger condition for conditional handover be determined based on the beam measurement result(s) and cell measurement result(s); where
  the first determining condition is a condition corresponding to beam measurement result(s), and the second determining condition is a condition corresponding to cell measurement result(s).

Optionally, the beam measurement result includes at least one of the following:
  a measurement result of a CSI-RS;
  a measurement result of an SSB;
  a measurement result of a DMRS; or
  a measurement result of another reference signal.

Optionally, the measurement result includes at least one of the following:
  RSRP, RSRQ, SINR, or CQI.

An embodiment of this disclosure further provides a terminal, including a processor, a memory, and a computer program stored in the memory and capable of running on the processor, where when the computer program is executed by the processor, the processes in the foregoing embodiments of the random access method can be implemented, with the same technical effect achieved. To avoid repetition, details are not described herein again.

Figure 3:
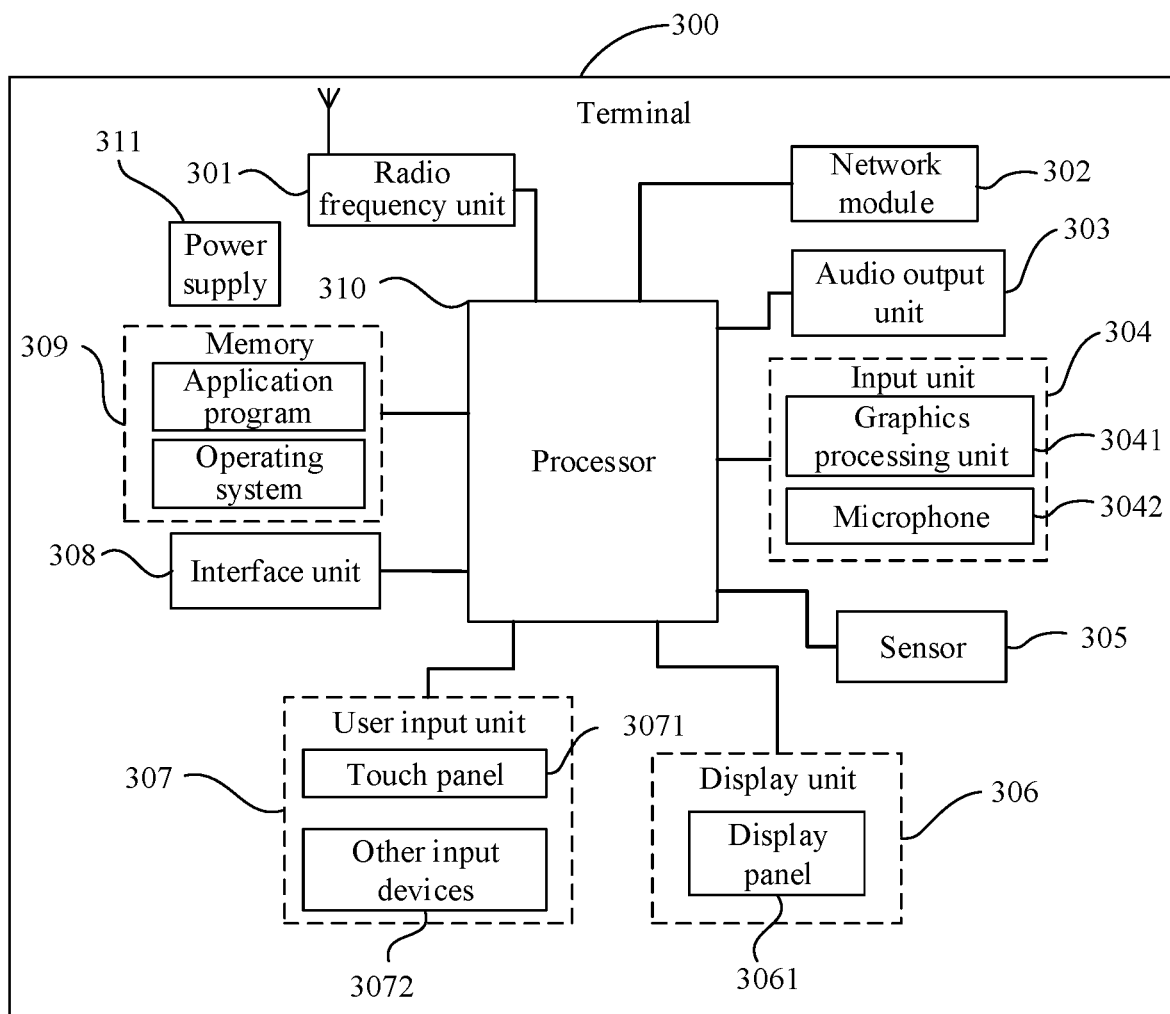
FIG. 3 is a second schematic structural diagram of a terminal according to an embodiment of this disclosure.

Specifically, FIG. 3 is a schematic diagram of a hardware structure of a terminal for implementing the embodiments of this disclosure. The terminal 300 includes but is not limited to components such as a radio frequency unit 301, a network module 302, an audio output unit 303, an input unit 304, a sensor 305, a display unit 306, a user input unit 307, an interface unit 308, a memory 309, a processor 310, and a power supply 311. A person skilled in the art can understand that the structure of the terminal shown in FIG. 3 does not constitute any limitation on the terminal, and the terminal may include more or fewer components than shown in the diagram, or some components may be combined, or the components may be arranged in different manners. In this embodiment of this disclosure, the terminal includes but is not limited to a mobile phone, a tablet computer, a laptop computer, a personal digital assistant, an in-vehicle terminal, a wearable device, a pedometer, and the like.

The processor 310 is configured to obtain beam measurement result(s) of at least one potential target cell; select a target cell from the at least one potential target cell based on the beam measurement result(s) and a first conditional handover trigger condition; and initiate a random access procedure in the target cell.

The terminal 300 of this embodiment of this disclosure can implement the processes implemented in the method embodiment shown in FIG. 1, with the same beneficial effects achieved. To avoid repetition, details are not described herein again.

It should be understood that, in this embodiment of this disclosure, the radio frequency unit 301 may be configured to transmit and receive a signal in an information transmitting/receiving or call process. Specifically, the radio frequency unit 301 receives downlink data from a base station and transmits the downlink data to the processor 310 for processing; and transmits uplink data to the base station. Generally, the radio frequency unit 301 includes but is not limited to an antenna, at least one amplifier, a transceiver, a coupler, a low noise amplifier, a duplexer, and the like. In addition, the radio frequency unit 301 may also communicate with a network and other devices via a wireless communications system.

The terminal provides a user with wireless broadband Internet access by using the network module 302, for example, helping the user to send and receive e-mails, browse web pages, and access streaming media.

The audio output unit 303 may convert audio data received by the radio frequency unit 301 or the network module 302 or stored in the memory 309 into an audio signal and output the audio signal as a sound. In addition, the audio output unit 303 may further provide audio output (for example, a call signal reception tone or a message reception tone) that is related to a specific function performed by the terminal 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042. The graphics processing unit 3041 processes image data of a still picture or a video obtained by an image capture apparatus (for example, a camera) in an image capture mode or a video capture mode. A processed image frame may be displayed on the display unit 306. An image frame processed by the graphics processing unit 3041 may be stored in the memory 309 (or another storage medium) or transmitted by the radio frequency unit 301 or the network module 302. The microphone 3042 is capable of receiving sounds and processing such sounds into audio data. The processed audio data can be converted in a phone call mode into a format that can be transmitted by the radio frequency unit 301 to a mobile communication base station, and output as such.

The terminal 300 may further include at least one sensor 305, for example, an optical sensor, a motion sensor, and other sensors. Specifically, the optical sensor may include an ambient light sensor and a proximity sensor. The ambient light sensor may adjust luminance of the display panel 3061 based on brightness of ambient light, and the proximity sensor may turn off the display panel 3061 and/or backlight when the terminal 300 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 305 may further include a fingerprint sensor, a pressure sensor, an iris sensor, a molecular sensor, a gyroscope, a barometer, a hygrometer, a thermometer, an infrared sensor, and the like. Details are not further described herein.

The display unit 306 is configured to display information input by the user or information provided to the user. The display unit 306 may include the display panel 3061. The display panel 3061 may be configured in a form of a liquid crystal display (LCD), an organic light-emitting diode (OLED), or the like.

The user input unit 307 may be configured to receive input digit or character information, and generate key signal input associated with user settings and function control of the terminal. Specifically, the user input unit 307 includes a touch panel 3071 and other input devices 3072. The touch panel 3071, or referred to as a touchscreen, may capture a touch operation performed by a user on or near the touch panel 3071 (for example, an operation performed by the user on the touch panel 3071 or near the touch panel 3071 by using any appropriate object or accessory such as a finger or a stylus). The touch panel 3071 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, transmits the touch point coordinates to the processor 310, and receives and executes a command transmitted by the processor 310. In addition, the touch panel 3071 may be implemented in a plurality of forms, for example, as a resistive, capacitive, infrared, or surface acoustic wave touch panel. In addition to the touch panel 3071, the user input unit 307 may further include other input devices 3072. Specifically, the other input devices 3072 may include but are not limited to a physical keyboard, a function key (for example, a volume control key or a power on/off key), a trackball, a mouse, and a joystick. Details are not described herein.

Further, the touch panel 3071 may cover the display panel 3061. When detecting a touch operation on or near the touch panel 3071, the touch panel 3071 transmits the touch operation to the processor 310 for determining a type of the touch event. Then, the processor 310 provides a corresponding visual output on the display panel 3061 based on the type of the touch event. In FIG. 3, the touch panel 3071 and the display panel 3061 serve as two separate components to implement input and output functions of the terminal. However, in some embodiments, the touch panel 3071 and the display panel 3061 may be integrated to implement the input and output functions of the terminal. This is not specifically limited herein.

The interface unit 308 is an interface between an external apparatus and the terminal 300. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 308 may be configured to receive an input (for example, data information or power) from the external apparatus and transmit the received input to one or more elements within the terminal 300, or may be configured to transmit data between the terminal 300 and the external apparatus.

The memory 309 may be configured to store software programs and various data. The memory 309 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 309 may include a high-speed random access memory, and may further include a non-volatile memory such as a disk storage device, a flash memory device, or other volatile solid-state storage devices.

The processor 310 is a control center of the terminal, and is connected to all components of the terminal by using various interfaces and lines. By running or executing software programs and/or modules that are stored in the memory 309 and calling data stored in the memory 309, the processor 310 executes various functions of the terminal and processes data, so as to perform overall monitoring on the terminal. The processor 310 may include one or more processing units. Optionally, the processor 310 may integrate an application processor and a modem processor. The application processor mainly processes an operating system, a user interface, an application program, and the like. The modem processor mainly processes wireless communication. It can be understood that the modem processor may alternatively be not integrated in the processor 310.

The terminal 300 may further include a power supply 311 (for example, a battery) that supplies power to the components. Optionally, the power supply 311 may be logically connected to the processor 310 through a power management system, so as to implement functions such as charging management, discharging management, and power consumption management through the power management system.

In addition, the terminal 300 may further include some functional modules that are not shown. Details are not described herein.

An embodiment of this disclosure further provides a computer readable storage medium, where the computer readable storage medium stores a computer program, and when the computer program is executed by a processor, the processes of the foregoing embodiments of the random access method applied to a terminal can be implemented. To avoid repetition, details are not described herein again. The computer-readable storage medium may be, for example, a read-only memory (ROM), a random access memory (RAM), a magnetic disk, or an optical disc.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software on a necessary universal hardware platform or by hardware only. In most cases, the former is a preferred implementation though. Based on such an understanding, the technical solutions of this disclosure essentially or the part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A random access method, applied to a terminal and comprising:
    obtaining beam measurement result(s) of at least one potential target cell;
    selecting a target cell from the at least one potential target cell based on the beam measurement result(s) and a first trigger condition for conditional handover; and
    initiating a random access procedure in the target-cell cell;
    wherein the first trigger condition for conditional handover is:
    that a beam measurement result of a potential target cell satisfies a first determining condition;
    wherein a precondition for adopting the first trigger condition for conditional handover is any one of the following:
    that the terminal is configured with a parameter relevant to the first determining condition;
    that the terminal is configured with no parameter relevant to a second determining condition;
    that the terminal is configured with a parameter relevant to the first determining condition and a parameter relevant to a second determining condition; or
    that the terminal is configured with indication information, wherein the indication information is used to explicitly or implicitly indicate that a trigger condition for conditional handover be determined based on beam measurement result(s), or the indication information is used to explicitly or implicitly indicate that a trigger condition for conditional handover be determined based on beam measurement result(s) and cell measurement result(s);
    wherein the first determining condition is a condition corresponding to beam measurement result(s), and the parameter relevant to the first determining condition is a threshold parameter corresponding to the trigger condition for conditional handover based on the beam measurement result(s);
    wherein the second determining condition is a condition corresponding to cell measurement result(s), and the parameter relevant to the second determining condition is a threshold parameter corresponding to the trigger condition for conditional handover based on the cell measurement result(s).

2. The method according to claim 1, wherein before the selecting a target cell from the at least one potential target cell based on the beam measurement result(s) and a first conditional handover trigger condition, the method further comprises:
    obtaining cell measurement result(s) of the at least one potential target cell; and
    the selecting a target cell from the at least one potential target cell based on the beam measurement result(s) and the first trigger condition for conditional handover comprises:
    selecting the target cell from the at least one potential target cell based on the beam measurement result(s), the cell measurement result(s), and the first conditional handover trigger condition.

3. The method according to claim 2, wherein the first trigger condition for conditional handover is:
    that a beam measurement result of a potential target cell satisfies the first determining condition, and a cell measurement result of the potential target cell satisfies the second determining condition.

4. The method according to claim 3, wherein the second determining condition comprises at least one of the following events:
    that a cell measurement result of a serving cell is greater than a first absolute threshold;
    that a cell measurement result of a serving cell is less than a second absolute threshold;
    that a cell measurement result of a potential target cell is better than a cell measurement result of a serving cell;
    that a cell measurement result of a potential target cell is greater than a third absolute threshold; or
    that a cell measurement result of a serving cell is less than a fourth absolute threshold, and a cell measurement result of a potential target cell is greater than a fifth absolute threshold;
    and/or
    wherein a precondition for adopting the first trigger condition for conditional handover is any one of the following:
    that the terminal is configured with a parameter relevant to the first determining condition and a parameter relevant to the second determining condition; or
    that the terminal is configured with indication information, wherein the indication information is used to explicitly or implicitly indicate that a trigger condition for conditional handover be determined based on the beam measurement result(s) and cell measurement result(s).

5. The method according to claim 3, wherein the selecting the target cell from the at least one potential target cell based on the beam measurement result(s), the cell measurement result(s), and the first trigger condition for conditional handover comprises:
  in a case that cell measurement results of a plurality of potential target cells satisfy the second determining condition, selecting a potential target cell with a largest quantity of sixth beams as the target cell, or selecting any one of potential target cells with a quantity of seventh beams greater than a third preset quantity as the target cell; wherein
  a measurement result of the sixth beam satisfies the first determining condition; and a measurement result of the seventh beam satisfies the first determining condition.

6. The method according to claim 1, wherein the first determining condition comprises any one of the following:
  that a beam whose measurement result is not less than a first preset threshold is present in a potential target cell;
  that a quantity of first beams in a potential target cell is greater than or equal to a first preset quantity, wherein a measurement result of the first beam is not less than a second preset threshold;
  that a quantity of second beams in a potential target cell is greater than or equal to a quantity of third beams in a serving cell, wherein a measurement result of the second beam is not less than a third preset threshold, and a measurement result of the third beam is not less than a fourth preset threshold; or
  that a difference between a quantity of fourth beams in a potential target cell and a quantity of fifth beams in a serving cell is greater than or equal to a second preset quantity, wherein a measurement result of the fourth beam is not less than a fifth preset threshold, and a measurement result of the fifth beam is not less than a sixth preset threshold.

7. The method according to claim 1, further comprising:
  obtaining cell measurement result(s) of the at least one potential target cell; and
  selecting a target cell from the at least one potential target cell based on the cell measurement result(s) and a second trigger condition for conditional handover; wherein
  the second trigger condition for conditional handover is:
  that a cell measurement result of a potential target cell satisfies a second determining condition.

8. The method according to claim 7, wherein a precondition for adopting the second trigger condition for conditional handover is any one of the following:
  that the terminal is configured with no parameter relevant to the first determining condition;
  that the terminal is configured with a parameter relevant to the second determining condition;
  that the terminal is configured with a parameter relevant to the first determining condition and a parameter relevant to the second determining condition; or
  that the terminal is configured with indication information, wherein the indication information is used to explicitly or implicitly indicate that a trigger condition for conditional handover be determined based on cell measurement result(s), or the indication information is used to explicitly or implicitly indicate that a trigger condition for conditional handover be determined based on the beam measurement result(s) and cell measurement result(s).

9. The method according to claim 1, wherein the beam measurement result comprises at least one of the following:
  a measurement result of a channel state information reference signal (CSI-RS);
  a measurement result of a synchronization signal and PBCH block (SSB);
  a measurement result of a demodulation reference signal (DMRS); or a measurement result of another reference signal;
  wherein the measurement result comprises at least one of the following:
  reference signal received power (RSRP);
  reference signal received quality (RSRQ);
  signal to interference plus noise ratio (SINR); or
  channel quality indicator (CQI).

10. A terminal, comprising a processor, a memory, and a computer program stored in the memory and capable of running on the processor, wherein the computer program is executed by the processor to implement:
  obtaining beam measurement result(s) of at least one potential target cell;
  selecting a target cell from the at least one potential target cell based on the beam measurement result(s) and a first trigger condition for conditional handover; and
  initiating a random access procedure in the target cell;
  wherein the first trigger condition for conditional handover is:
  that a beam measurement result of a potential target cell satisfies a first determining condition;
  wherein a precondition for adopting the first trigger condition for conditional handover is any one of the following:
  that the terminal is configured with a parameter relevant to the first determining condition;
  that the terminal is configured with no parameter relevant to a second determining condition;
  that the terminal is configured with a parameter relevant to the first determining condition and a parameter relevant to the second determining condition; or
  that the terminal is configured with indication information, wherein the indication information is used to explicitly or implicitly indicate that a trigger condition for conditional handover be determined based on beam measurement result(s), or the indication information is used to explicitly or implicitly indicate that a trigger condition for conditional handover be determined based on beam measurement result(s) and cell measurement result(s);
  wherein the first determining condition is a condition corresponding to beam measurement result(s), and the parameter relevant to the first determining condition is a threshold parameter corresponding to the trigger condition for conditional handover based on the beam measurement result(s);
  wherein the second determining condition is a condition corresponding to cell measurement result(s), and the parameter relevant to the second determining condition is a threshold parameter corresponding to the trigger condition for conditional handover based on the cell measurement result(s).

11. The terminal according to claim 10, wherein the computer program is further executed by the processor to implement:
  obtaining cell measurement result(s) of the at least one potential target cell;
  selecting the target cell from the at least one potential target cell based on the beam measurement result(s), the cell measurement result(s), and the first conditional handover trigger condition.

12. The terminal according to claim 11, wherein the first trigger condition for conditional handover is:
that a beam measurement result of a potential target cell satisfies the first determining condition, and a cell measurement result of the potential target cell satisfies the second determining condition.

13. The terminal according to claim 12, wherein the second determining condition comprises at least one of the following events:
that a cell measurement result of a serving cell is greater than a first absolute threshold;
that a cell measurement result of a serving cell is less than a second absolute threshold;
that a cell measurement result of a potential target cell is better than a cell measurement result of a serving cell;
that a cell measurement result of a potential target cell is greater than a third absolute threshold; or
that a cell measurement result of a serving cell is less than a fourth absolute threshold, and a cell measurement result of a potential target cell is greater than a fifth absolute threshold;
and/or
wherein a precondition for adopting the first trigger condition for conditional handover is any one of the following:
that the terminal is configured with a parameter relevant to the first determining condition and a parameter relevant to the second determining condition; or
that the terminal is configured with indication information, wherein the indication information is used to explicitly or implicitly indicate that a trigger condition for conditional handover be determined based on the beam measurement result(s) and cell measurement result(s).

14. The terminal according to claim 12, wherein the selecting the target cell from the at least one potential target cell based on the beam measurement result(s), the cell measurement result(s), and the first trigger condition for conditional handover comprises:
in a case that cell measurement results of a plurality of potential target cells satisfy the second determining condition, selecting a potential target cell with a largest quantity of sixth beams as the target cell, or selecting any one of potential target cells with a quantity of seventh beams greater than a third preset quantity as the target cell; wherein
a measurement result of the sixth beam satisfies the first determining condition; and a measurement result of the seventh beam satisfies the first determining condition.

15. The terminal according to claim 10, wherein the first determining condition comprises any one of the following:
that a beam whose measurement result is not less than a first preset threshold is present in a potential target cell;
that a quantity of first beams in a potential target cell is greater than or equal to a first preset quantity, wherein a measurement result of the first beam is not less than a second preset threshold;
that a quantity of second beams in a potential target cell is greater than or equal to a quantity of third beams in a serving cell, wherein a measurement result of the second beam is not less than a third preset threshold, and a measurement result of the third beam is not less than a fourth preset threshold; or
that a difference between a quantity of fourth beams in a potential target cell and a quantity of fifth beams in a serving cell is greater than or equal to a second preset quantity, wherein a measurement result of the fourth beam is not less than a fifth preset threshold, and a measurement result of the fifth beam is not less than a sixth preset threshold.

16. A non-transitory computer-readable storage medium, storing a computer program, wherein the computer program is executed by a processor to implement:
obtaining beam measurement result(s) of at least one potential target cell;
selecting a target cell from the at least one potential target cell based on the beam measurement result(s) and a first trigger condition for conditional handover; and
initiating a random access procedure in the target cell;
wherein the first trigger condition for conditional handover is:
that a beam measurement result of a potential target cell satisfies a first determining condition;
wherein a precondition for adopting the first trigger condition for conditional handover is any one of the following:
that the terminal is configured with a parameter relevant to the first determining condition;
that the terminal is configured with no parameter relevant to a second determining condition;
that the terminal is configured with a parameter relevant to the first determining condition and a parameter relevant to a second determining condition; or
that the terminal is configured with indication information, wherein the indication information is used to explicitly or implicitly indicate that a trigger condition for conditional handover be determined based on beam measurement result(s), or the indication information is used to explicitly or implicitly indicate that a trigger condition for conditional handover be determined based on beam measurement result(s) and cell measurement result(s);
wherein the first determining condition is a condition corresponding to beam measurement result(s), and the parameter relevant to the first determining condition is a threshold parameter corresponding to the trigger condition for conditional handover based on the beam measurement result(s);
wherein the second determining condition is a condition corresponding to cell measurement result(s), and the parameter relevant to the second determining condition is a threshold parameter corresponding to the trigger condition for conditional handover based on the cell measurement result(s).

17. The non-transitory computer-readable storage medium according to claim 16, wherein the computer program is further executed by the processor to implement:
obtaining cell measurement result(s) of the at least one potential target cell;
selecting the target cell from the at least one potential target cell based on the beam measurement result(s), the cell measurement result(s), and the first conditional handover trigger condition.

18. The non-transitory computer-readable storage medium according to claim 17, wherein the first trigger condition for conditional handover is:
that a beam measurement result of a potential target cell satisfies the first determining condition, and a cell measurement result of the potential target cell satisfies the second determining condition.

19. The non-transitory computer-readable storage medium according to claim 18, wherein the second determining condition comprises at least one of the following events:
  that a cell measurement result of a serving cell is greater than a first absolute threshold;
  that a cell measurement result of a serving cell is less than a second absolute threshold;
  that a cell measurement result of a potential target cell is better than a cell measurement result of a serving cell;
  that a cell measurement result of a potential target cell is greater than a third absolute threshold; or
  that a cell measurement result of a serving cell is less than a fourth absolute threshold, and a cell measurement result of a potential target cell is greater than a fifth absolute threshold;
  and/or
  wherein a precondition for adopting the first trigger condition for conditional handover is any one of the following:
  that the terminal is configured with a parameter relevant to the first determining condition and a parameter relevant to the second determining condition; or
  that the terminal is configured with indication information, wherein the indication information is used to explicitly or implicitly indicate that a trigger condition for conditional handover be determined based on the beam measurement result(s) and cell measurement result(s).

20. The non-transitory computer-readable storage medium according to claim 16, wherein the first determining condition comprises any one of the following:
  that a beam whose measurement result is not less than a first preset threshold is present in a potential target cell;
  that a quantity of first beams in a potential target cell is greater than or equal to a first preset quantity, wherein a measurement result of the first beam is not less than a second preset threshold;
  that a quantity of second beams in a potential target cell is greater than or equal to a quantity of third beams in a serving cell, wherein a measurement result of the second beam is not less than a third preset threshold, and a measurement result of the third beam is not less than a fourth preset threshold; or
  that a difference between a quantity of fourth beams in a potential target cell and a quantity of fifth beams in a serving cell is greater than or equal to a second preset quantity, wherein a measurement result of the fourth beam is not less than a fifth preset threshold, and a measurement result of the fifth beam is not less than a sixth preset threshold.

* * * * *